(12) United States Patent
Shiga

(10) Patent No.: US 7,317,272 B2
(45) Date of Patent: Jan. 8, 2008

(54) ROTOR OF MOTOR

(75) Inventor: Tsuyoshi Shiga, Nagoya (JP)

(73) Assignees: Kabushiki Kaisha Toshiba, Tokyo (JP); Toshiba Ha Products Co., Ltd., Osaka (JP); Toshiba Consumer Marketing Corporation, Tokyo (JP)

( * ) Notice: Subject to any disclaimer, the term of this patent is extended or adjusted under 35 U.S.C. 154(b) by 0 days.

(21) Appl. No.: 10/571,581

(22) PCT Filed: Aug. 31, 2004

(86) PCT No.: PCT/JP2004/012559

§ 371 (c)(1),
(2), (4) Date: Mar. 10, 2006

(87) PCT Pub. No.: WO2005/034306

PCT Pub. Date: Apr. 14, 2005

(65) Prior Publication Data

US 2007/0029886 A1 Feb. 8, 2007

(30) Foreign Application Priority Data

Sep. 30, 2003 (JP) ............................. 2003-340225

(51) Int. Cl.
*H02K 1/27* (2006.01)
(52) U.S. Cl. ............................. 310/156.12; 310/156.53
(58) Field of Classification Search .......... 310/156.08, 310/156.53, 156.56, 156.57, 216, 261, 45, 310/153, 156.12, 156.09
See application file for complete search history.

(56) References Cited

U.S. PATENT DOCUMENTS

| | | | | |
|---|---|---|---|---|
| 3,290,525 A | * | 12/1966 | Sudmeier | 310/153 |
| 5,528,092 A | * | 6/1996 | Ohta | 310/67 R |
| 5,796,200 A | * | 8/1998 | Sakashita et al. | 310/156.05 |
| 5,907,206 A | * | 5/1999 | Shiga et al. | 310/156.05 |
| 6,093,984 A | * | 7/2000 | Shiga et al. | 310/26 |
| 6,257,027 B1 | * | 7/2001 | Imai | 68/12.12 |
| 6,657,328 B2 | * | 12/2003 | Shiga et al. | 310/26 |
| 6,700,279 B1 | * | 3/2004 | Uchiyama et al. | 310/190 |

FOREIGN PATENT DOCUMENTS

| | | |
|---|---|---|
| JP | 1987-168942 | 5/1989 |
| JP | 1987-174815 | 5/1989 |
| JP | 9-131009 | 5/1997 |
| JP | 2002-010544 | 1/2002 |

* cited by examiner

*Primary Examiner*—Tran Nguyen
(74) *Attorney, Agent, or Firm*—Pillsbury Winthrop Shaw Pittman, LLP

(57) ABSTRACT

A rotor for an electric motor includes a base plate (13) made of a magnetic material and coupled to a rotational shaft (12), a rotor core (18) provided on the base plate (13) and including a protrusion protruding axially relative to the base plate and the teeth of the stator, the rotor core having an outer peripheral face and an axial end, a plurality of magnet insertion portions defined in the rotor core, a plurality of rotor magnets provided in the magnet insertion portions respectively, each magnet having a stator side and a counter-stator side both magnetized so as to have poles differing from each other, and a position sensor detecting a rotational position of the rotor core and disposed radially or axially opposite the outer peripheral face or the axial end of the rotor core so as to correspond to the protrusion of the rotor core.

8 Claims, 9 Drawing Sheets

ROTOR OF MOTOR

CROSS REFERENCE TO RELATED APPLICATIONS

This is the U.S. National Phase of PCT/JP2004/012559, filed Aug. 31, 2004, which in turn claims priority to Japanese Patent Application No. 2003-340225, filed Sep. 30, 2003, both of which are incorporated herein in their entirety by reference.

TECHNICAL FIELD

This invention relates to a rotor for an electric motor of the outer rotor type in which the rotor is provided for rotation around a stator.

BACKGROUND ART

Japanese Patent No. 3017953 discloses a rotor for an electric motor of the above-described type. FIGS. 8A and 8B of the present application illustrate the conventional rotor for an electric motor. As shown, the rotor includes a rotor core 102 provided for rotation around a stator 101. The rotor core 102 is fixed to a bed plate 103 made from a magnetic material. The rotor core 102 includes a plurality of magnet insertion sections 104 formed therein. A rotor magnet 105 is fixed to each magnet insertion section 104.

In the above-described construction, a position sensor 107 is disposed in an air-gap defined between the stator 101 and the rotor core 102. Accordingly, the position sensor 107 is subject to the influence of magnetic flux from the stator 101. Moreover, the rotor core 102 has an axial dimension or height set to the same value as the stator core 101. Accordingly, an amount of magnetic flux acting upon the position sensor 107 is so small that the positional detection by the position sensor is insufficient.

The solid line in FIG. 9 shows a quasi-sine wave of magnetic flux distribution in the air gap having the circumferential center of the rotor magnet 105 serving as the peak value. Two-dot chain line in FIG. 9 shows output of the position sensor 107. As obvious from FIG. 9, the detection accuracy of the position sensor 107 is low in the above-described construction such that the detection of normal quasi-sine wave is mistimed. As a result, since the control of the stator coil 108 is mistimed relative to the current position of the rotor core 102, oscillation or vibration occurs during operation of the motor and/or an operating efficiency is reduced.

Therefore, an object of the present invention is to provide a rotor for an electric motor which can improve the operating efficiency of the motor.

The present invention provides a rotor for an electric motor of an outer rotor type which includes a rotational shaft and a stator having teeth, the rotor comprising a base plate made of a magnetic material and coupled to the rotational shaft, a rotor core provided on the base plate and including a protrusion protruding axially relative to the base plate and the teeth of the stator, the rotor core having an outer peripheral face and an axial end, a plurality of magnet insertion portions defined in the rotor core, a plurality of rotor magnets provided in the magnet insertion portions respectively, each magnet having a stator; side and a counter-stator side both magnetized so as to have poles differing from each other, and a position sensor detecting a rotational position. of the rotor core and disposed radially or axially opposite the outer peripheral face or the axial end of the rotor core so as to correspond to the protrusion, wherein the rotor core has a plurality of slits formed therein so as to be located between the rotor magnets peripherally adjacent to each other, each slit having an open outer peripheral face.

In the above-described construction, the position sensor is disposed radially or axially opposite the outer peripheral face or the axial end of the rotor core. Thus, since the position sensor is located away from the stator, adverse effects of the stator to the position sensor can be restrained and the detecting timing of the position sensor can be accurate. Consequently, the operating efficiency of the motor can be improved.

BEST MODE FOR CARRYING OUT THE INVENTION

The invention will be described in detail with reference to the accompanying drawings.

First Embodiment

Figure 1A:
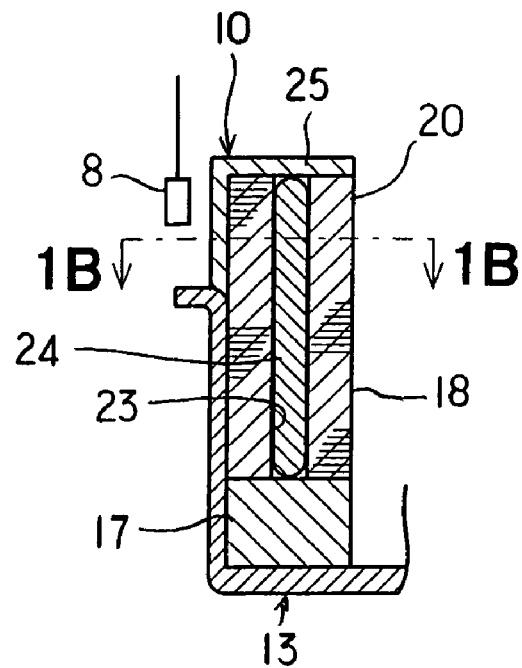
FIG. 1A is an enlarged sectional view of the rotor in accordance with one embodiment of the present invention.
Figure 1B:
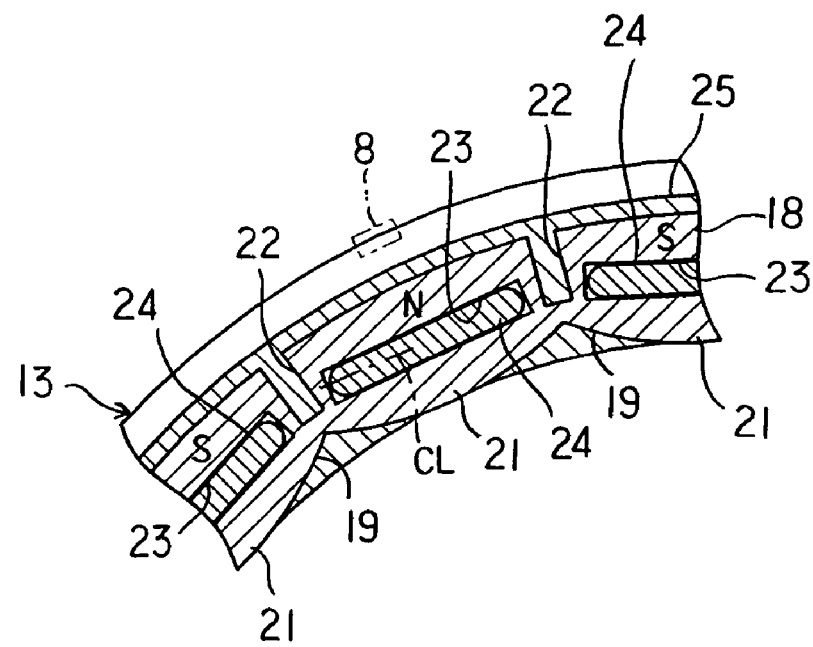
FIG. 1B is a sectional view taken along line 1B in FIG. 1A.
Figure 2:
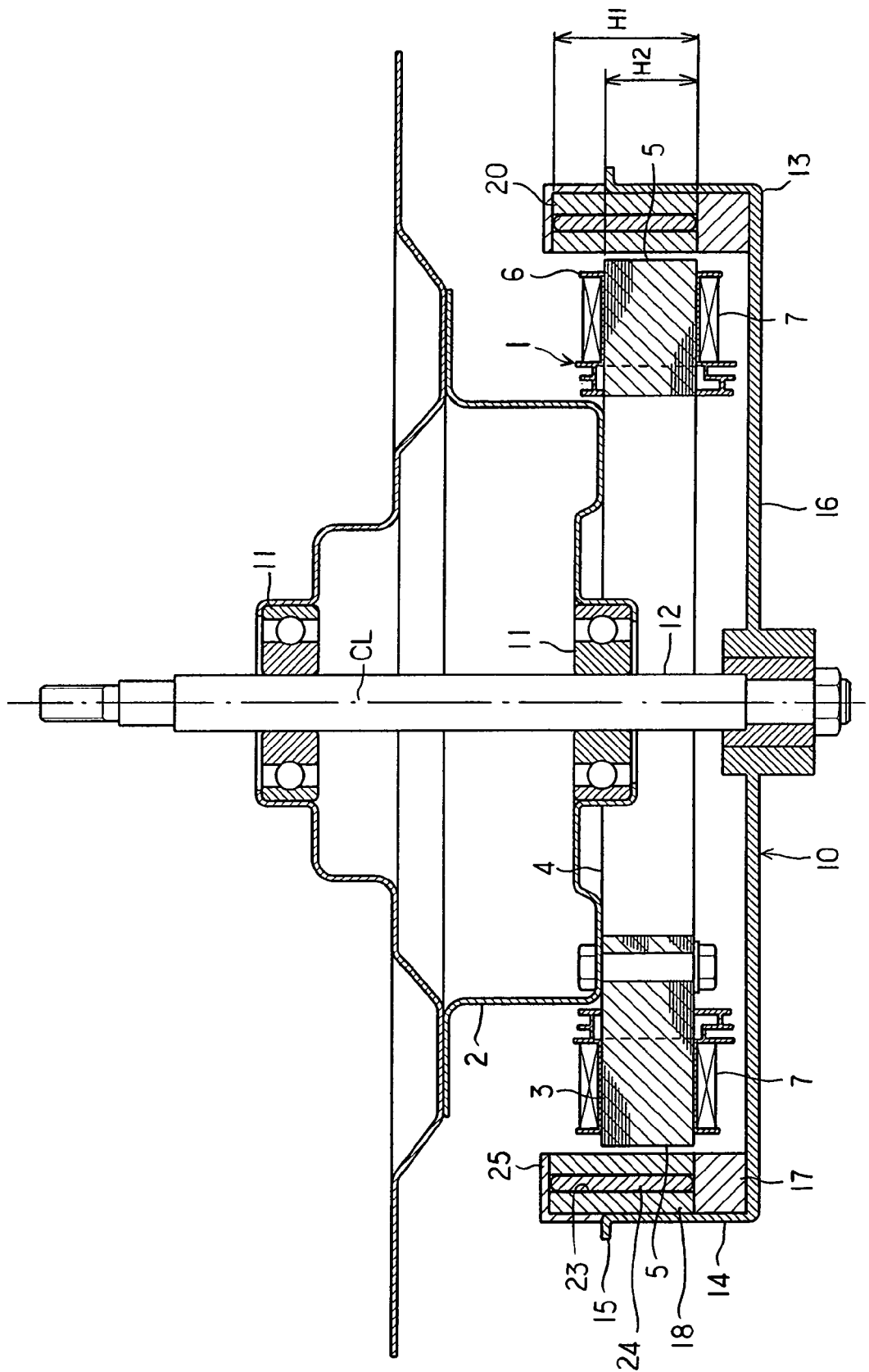
FIG. 2 is a sectional view of the stator and rotor both assembled together.

FIGS. 1A, 1B and 2 show a first embodiment of the invention. Referring first to FIG. 2, a stator 1 includes a base 2 and a stator core 3 screwed to the base. The stator core 3 is formed by axially stacking a number of magnetic steel sheets and includes a generally cylindrical yoke 4 and a plurality of radially extending teeth 5. An insulating layer 6 made of a synthetic resin is formed on a surface of the teeth 5. Phase U, V and W coils 7 are wound on the insulating layer 6. An arm-shaped holder (not shown) extending toward the outer periphery is fixed to the insulating layer 6. A position sensor 8 comprising Hall elements is fixed to the holder as shown in FIGS. 1A and 1B.

The rotor 10 will now be described. Two outer rings of bearings 11 are fixed to the base 2 as shown in FIG. 2. A rotational shaft 12 is fixed to inner rings of the bearings 11. The rotational shaft 12 extends along a central axis of the stator core 3 and has a lower end to which a rotor frame 13 serving as a base plate is fixed. The rotor frame 13 is made by pressing a magnetic steel plate and includes a cylindrical yoke 14, an annular flange 15 disposed on an upper end of the yoke 14 and a disc-like cover 16 covering the underside of the yoke 14.

An annular core base 17 is fixed to an inner circumferential face of the yoke 14 of the rotor 13. The core base 17 is made from a synthetic resin and has an upper end to which a cylindrical rotor core 18 is fixed. The rotor core 18 is formed by axially stacking magnetic steel sheets. The rotor core 18 has a plurality of recesses 19 formed therein circumferentially at regular pitches as shown in FIG. 1B.

The rotor core 18 has an axial dimension or height H1 set to be larger than an axial dimension or height H2 of the teeth 5 as shown in FIG. 2. An upper end of the teeth 5 is located as high as the upper end of the rotor frame 13. On the other hand, the upper end of the rotor core 18 protrudes upward relative to the upper ends of the teeth 5 and the rotor frame 13. Reference numeral 20 designates a protruding portion of the rotor core 18.

The rotor core 18 is formed with a plurality of magnetic poles 21 as shown in FIG. 1B. Each magnetic core 21 is located between two circumferentially adjacent recesses 19 and generally arc inner circumferential face. The rotor core 18 has a plurality of slits 22 formed therein circumferentially at regular pitches. Each slit 22 is located at a boundary between circumferentially adjacent magnetic poles 21 and formed into a rectangular shape with an open circumferential face.

Each magnetic pole 21 is formed with a magnet inserting portion 23, which is formed into a hole axially extending through the rotor core 18 as shown in FIG. 1A. A rotor magnet 24 made from neodymium (Nd) of high energy product is accommodated in each magnet inserting portion 23. Each rotor magnet 24 is formed into the shape of a plate and has inner and outer circumferential faces which are opposite to each other and have different poles from each other. Each rotor magnet 24 has an axial dimension or height set to the same value as that of the rotor core 18. Each slit 22 includes an inner circumference side bottom located at inner circumference side relative to the center line CL of a radial dimension or thickness of the rotor magnet 24 as shown in FIG. 1B.

An insulating layer 25 is formed on the rotor core 18 so as to cover an outer circumferential face and an upper end of the rotor core 24 as shown in FIG. 1A. The insulating layer 25 is made from the same synthetic resin formed as the rotor base 17. An upper side and underside of each magnet inserting portion 23 are closed by the insulating layer 25 and the core base 17 such that the rotor magnet 24 is enclosed in the magnet inserting portion 23, as shown in FIG. 1A. The position sensor 8 is disposed so as to be spaced away from the insulating layer 25, thereby axially opposing the outer circumferential face of the protrusion 20. The position sensor 8 is provided for detecting a rotational position of the rotor core 18. Switching of the phase U, V and W coils 7 is controlled on the basis of the results of detection by the position sensor 8, whereupon a rotating magnetic field is established to rotate the rotor 10 about the rotational shaft 12.

A method of manufacturing the rotor 10 will now be described. Firstly, the rotor magnets 24 are inserted into the magnet inserting portions 23 of the rotor core 18 respectively. In this state, each rotor magnet 24 is provisionally fixed to the inner face by the magnetic force and axially positioned relative to the magnet inserting portion 23 by the magnetic force.

The rotor frame 13 and rotor core 18 are accommodated in a cavity of a forming die (not shown). In this state, the rotor core 18 is preliminarily fixed to the inner circumferential face of the rotor frame 13 by the magnetic force. The rotor frame 13 is positioned by the magnetic force so as to be spaced away from the cover 16. Subsequently, molten resin is poured into the cavity of the forming die so that the core base 17 and the insulating layer 25 are integrally formed with each other.

According to the above-described embodiment, the position sensor 8 is disposed so as to be radially opposed to the outer circumferential face of the rotor core 18. Accordingly, since the distance between the position sensor 8 and the stator 1 is increased, the position sensor 8 is less susceptible to the adverse influence of the magnetic flux from the stator 1. Moreover, the rotor core 18 is provided with the protrusion 20 protruding relative to both rotor frame 13 and teeth 5, and the position sensor 8 detects the rotational position at the protrusion 20. Consequently, the magnetic flux can reliably be ensured.

Furthermore, the magnetic flux for the position sensor 8 is prevented from reflowing through the rotor frame 13. Accordingly, since the magnetic flux reliably reaches the position sensor 8, the detecting accuracy of the position sensor 8 can be improved. This improves the matching of the control timing of the stator coil 7 and the current position of the rotor core 18. Consequently, occurrence of vibration or oscillation can be prevented during the operation and accordingly, the operating efficiency can be improved.

Each slit 22 is formed in the rotor core 18 so as to be located between the circumferentially adjacent rotor magnets 24. Accordingly, since an amount of magnetic flux short-cutting the magnetic poles 21 of the rotor core 18 is reduced, the magnetic flux reflowing between the magnetic poles 21 of the rotor core 18 can be increased. Consequently, the detecting accuracy of the position sensor 8 can further be improved.

Furthermore, the insulating layer 25 made of a synthetic resin is provided on the surface of the protrusion 20. Accordingly, a jointing force of the rotor core 8 to the rotor frame 13 can be improved and rust prevention of the rotor core 8 can be improved. Moreover, since the upper side of each inserting portion 23 is closed by the insulating layer 25, foreign matter such as iron powder can be prevented from invading the magnet inserting portion 23.

Second Embodiment

A second embodiment of the invention will be described with reference to FIG. 3. The second embodiment differs from the foregoing first embodiment in the following respects.

Figure 3:
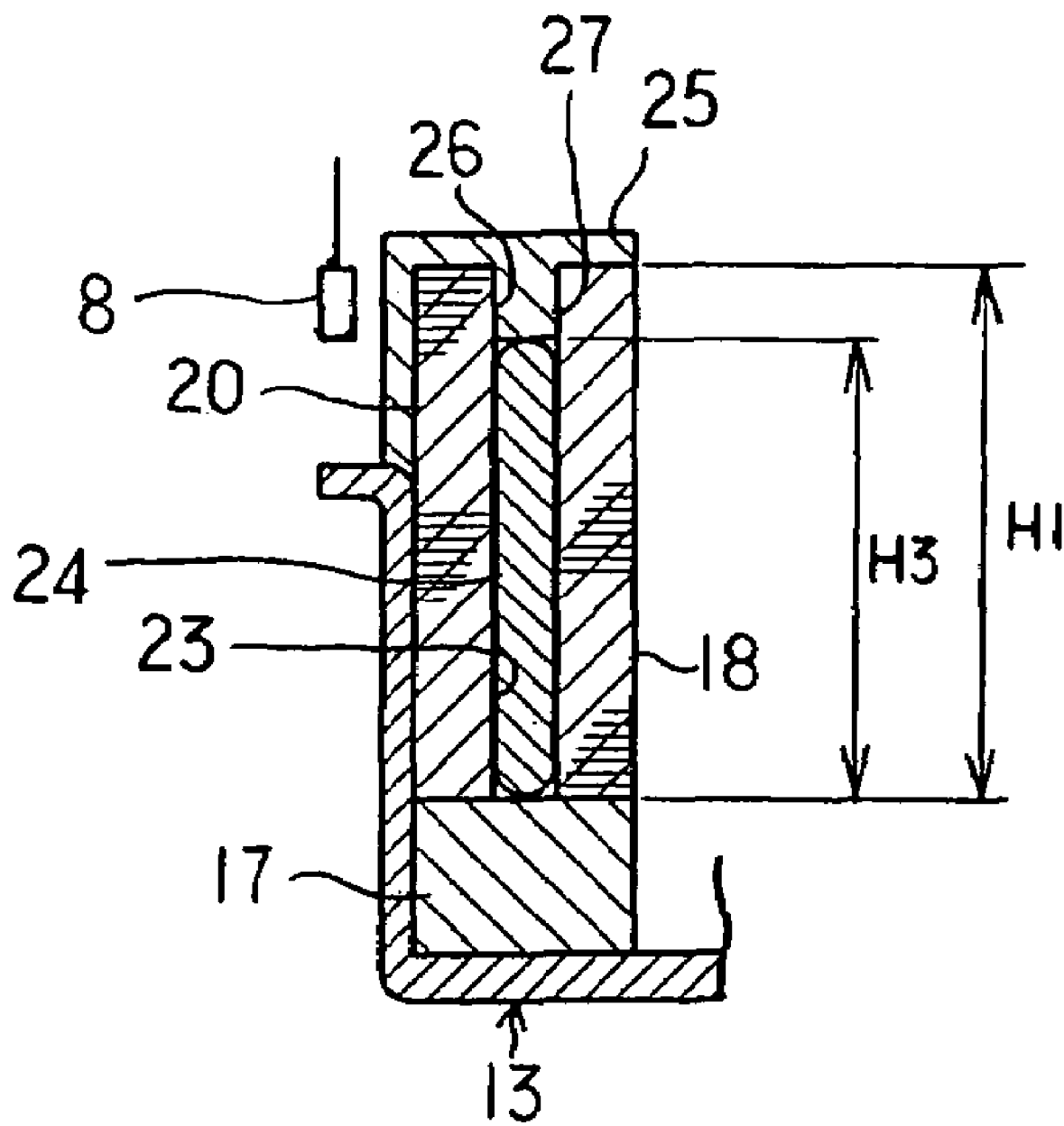
FIG. 3 is a view similar to FIG. 1A, showing a second embodiment of the invention.

Each rotor magnet 24 has the axial dimension H3 or height set so as to be smaller than the axial dimension H1 of the rotor core 18, as shown in FIG. 3. Each magnet inserting portion 23 has an inner upper end defined with a space 26 where no rotor magnet is provided. Each space 26 is formed with a closure 27 made of a synthetic resin, so that each rotor magnet 24 is confined in the magnet inserting portion 23 by the closure 27. Molten resin is poured into each space 26 in the forming of the core base 17 and the insulating layer 25, so that the closures 27 are formed integrally with the core base and the insulating layer. The position sensor 8 is disposed so as to be spaced away from the closures 27, thereby axially opposing the outer circumferential face of the protrusion 20.

According to the second embodiment, the axial dimension H3 or height of each rotor magnet 24 is set so as to be smaller than the axial dimension H1 of the rotor core 18. Accordingly, since an amount of the expensive material for the rotor magnet 24 is reduced, a cost reduction can be achieved. Moreover, since the magnetic flux from the rotor magnet 24 reflows via the rotor core 18, a sufficient amount of magnetic flux can be ensured for the position sensor 8.

Third Embodiment

A third embodiment of the invention will be described with reference to FIGS. 4A and 4B. The third embodiment differs from the first embodiment in the following respects.

Figure 4A:
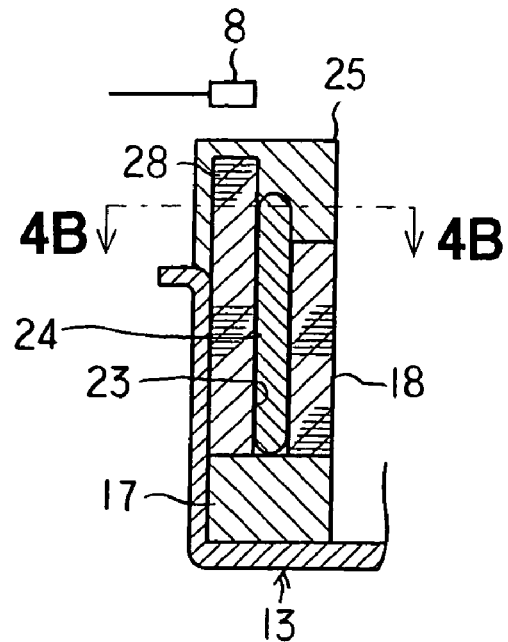
FIG. 4A is a view similar to FIG. 1A, showing a third embodiment of the invention.
Figure 4B:
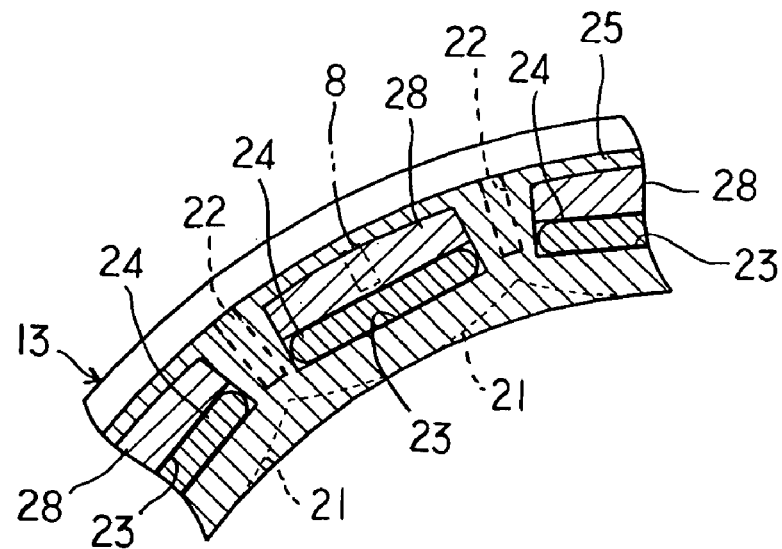
FIG. 4B is a view similar to FIG. 1B.

A plurality of magnetic walls 28 corresponding to the protrusions are formed on the upper end of the rotor core 18 as shown in FIGS. 4A and 4B. The magnetic walls 28 are adapted to come into contact with the outer circumferential faces of the rotor magnets 24. The position sensor 8 is axially opposed to upper ends of the magnetic walls 28.

According to the third embodiment, the protrusion-like magnetic walls 28 are formed on the outer circumferential faces of the rotor magnets 24 in the axial end of the rotor core 18. As a result, the magnetic flux tends to reflow circumferentially. Moreover, the magnetic walls 28, rotor magnets 24 and rotor core 18 have the respective upper ends located at different levels. Accordingly, since the magnetic flux for the position sensor 8 tends to axially reflow easily, the detecting accuracy of the position sensor can be improved when the position sensor is disposed so as to be opposed to the axial ends of the magnetic walls 28.

The position sensor 8 is axially opposed to upper ends of the magnetic walls 28 in the third embodiment. The arrangement of the position sensor 8 should not be limited to the above. For example, the position sensor 8 may be located so as to be opposed to the upper end of the magnetic walls 28 where no rotor magnets 24 are provided.

Fourth Embodiment

A fourth embodiment of the invention will be described with reference to FIG. 5. The fourth embodiment differs from the foregoing first embodiment in the following respects.

Figure 5:
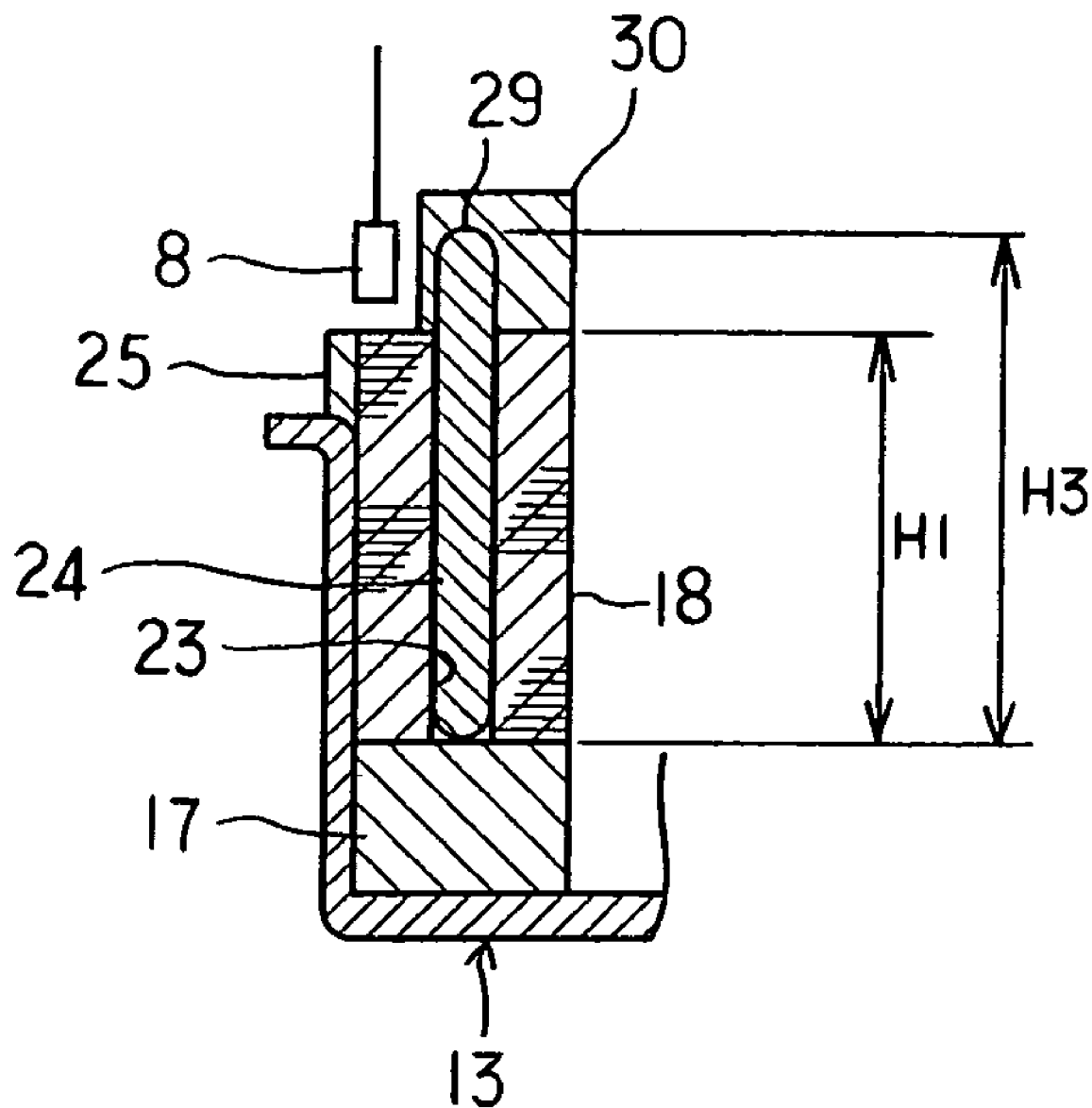
FIG. 5 is a view similar to FIG. 1A.

Each rotor magnet 24 has the axial dimension H3 or height set so as to be larger than the axial dimension H1 of the rotor core 18, as shown in FIG. 5. Each rotor magnet 24 includes a protrusion 29 protruding upward from the upper end of the rotor core 18. An insulating layer 30 is formed on the outer, inner and upper end faces of each protrusion 29. The insulating layers 30 are formed integrally with the core base 17 and insulating layer 25. The position sensor 8 is disposed so as to be axially opposed to the outer circumferential face of the protrusion 29.

According to the foregoing fourth embodiment, each rotor magnet 24 includes the protrusion 29 protruding from the axial end of the rotor core 18. The position sensor 8 is disposed so as to be axially opposed to the outer circumferential face of the protrusion 29. Consequently, the detecting accuracy of the position sensor 8 can be improved since the position sensor can directly detect the magnetic flux from the rotor magnet 24.

Fifth Embodiment

A fifth embodiment of the invention will be described with reference to FIGS. 6A and 6B. The fifth embodiment differs from the foregoing first embodiment in the following respects.

Figure 6A:
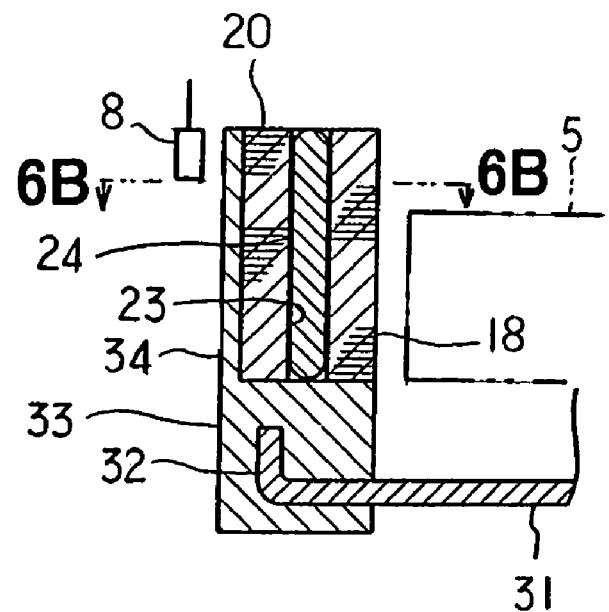
FIG. 6A is a view similar to FIG. 1A, showing a fifth embodiment of the invention.
Figure 6B:
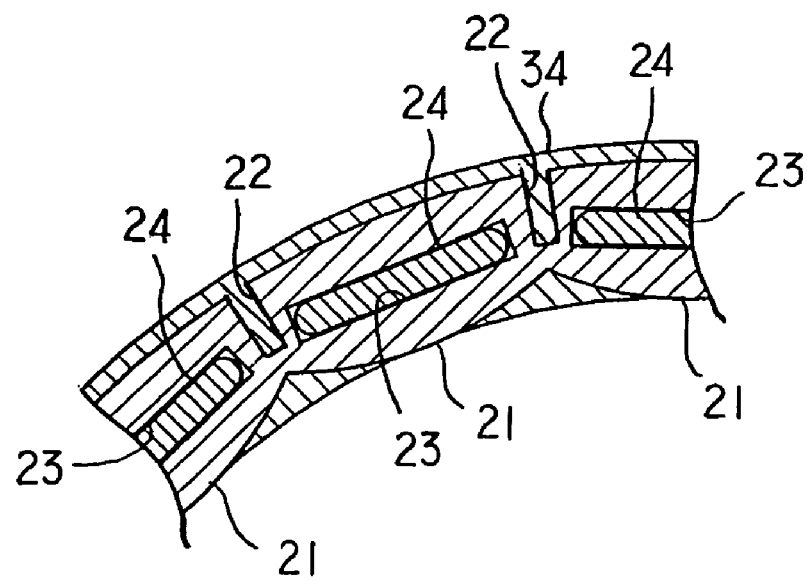
FIG. 6B is a view similar to FIG. 1B.

A rotor plate 31 made from a magnetic steel plate is fixed to the lower end of the rotational shaft 12 as shown in FIGS. 6A and 6B. The rotor plate 31 corresponds to the base plate and is formed into a disc. The rotor plate 31 includes a cylindrical wall 32 formed integrally on an outer circumference of the rotor plate 31. A cylindrical core base 33 is fixed to the outer circumference of the rotor plate 31. The rotor core 18 is fixed to an upper end of the core base 33. The core base 33 is made from a synthetic resin and includes an insulating layer 34 formed integrally therewith. The insulating layer 34 covers inner and outer circumferential faces of the rotor core 18. The rotor core 18 has a lower end face disposed on the same plane as the teeth 5 are disposed and an upper end face protruding relative to the upper end faces of the teeth 5. The position sensor 8 is disposed so as to be opposed to the outer circumferential face of the protrusion 20.

According to the fifth embodiment, the rotor core 18 is fixed to the synthetic resin core base 33 further fixed to the rotor plate 31. This eliminates a contact portion between the rotor plate 31 and the rotor core 18 and accordingly, the electrically insulating performance can be improved. Moreover, since the vibration or oscillation of the rotor core 18 is absorbed by the core base 33, the vibration is hard to transfer to the rotor plate 31.

Sixth Embodiment

A sixth embodiment of the invention will be described with reference to FIG. 7. The sixth embodiment differs from the foregoing first embodiment in the following respects.

Figure 7:
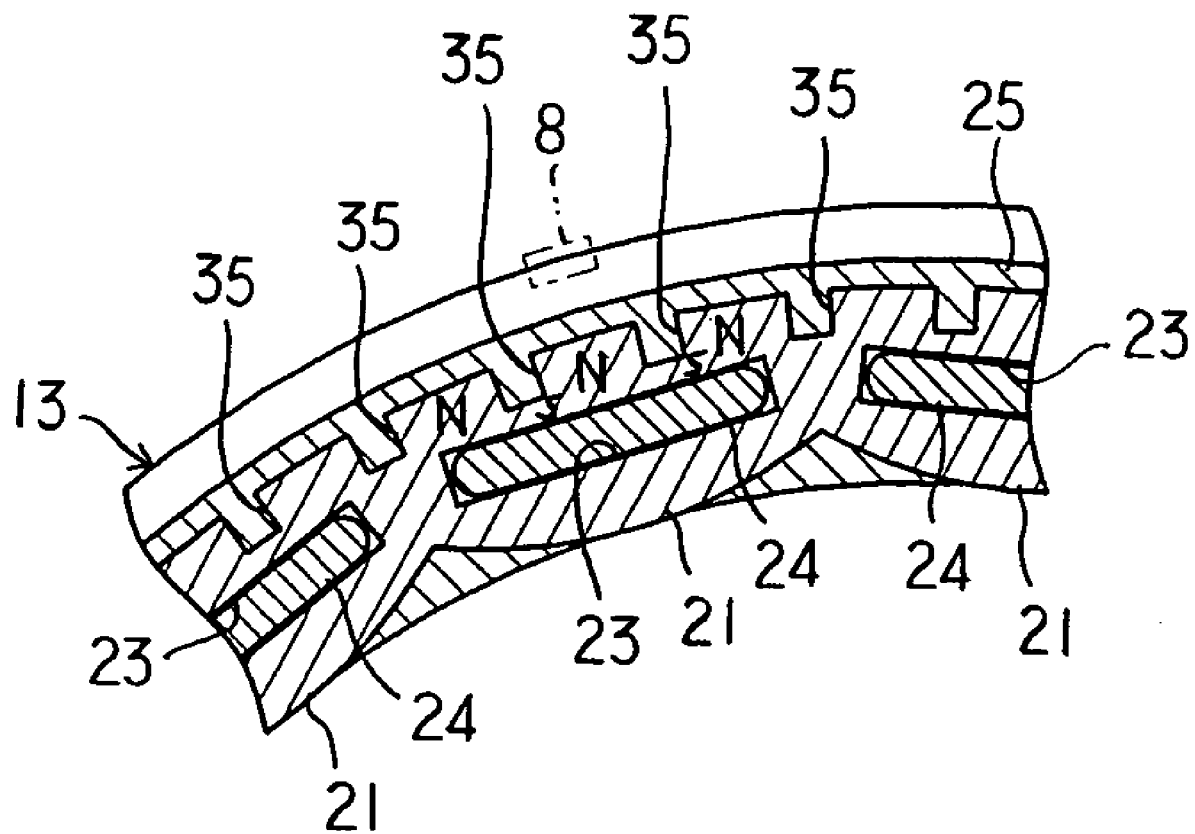
FIG. 7 is a view similar to FIG. 1A, showing a sixth embodiment of the invention.
Figure 8A:
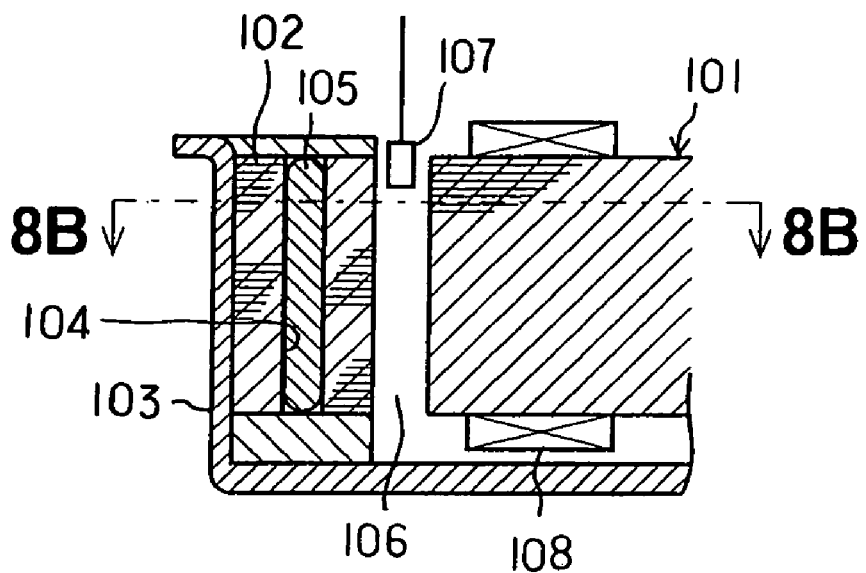
FIG. 8A is a view similar to FIG. 1A, showing a prior art.
Figure 8B:
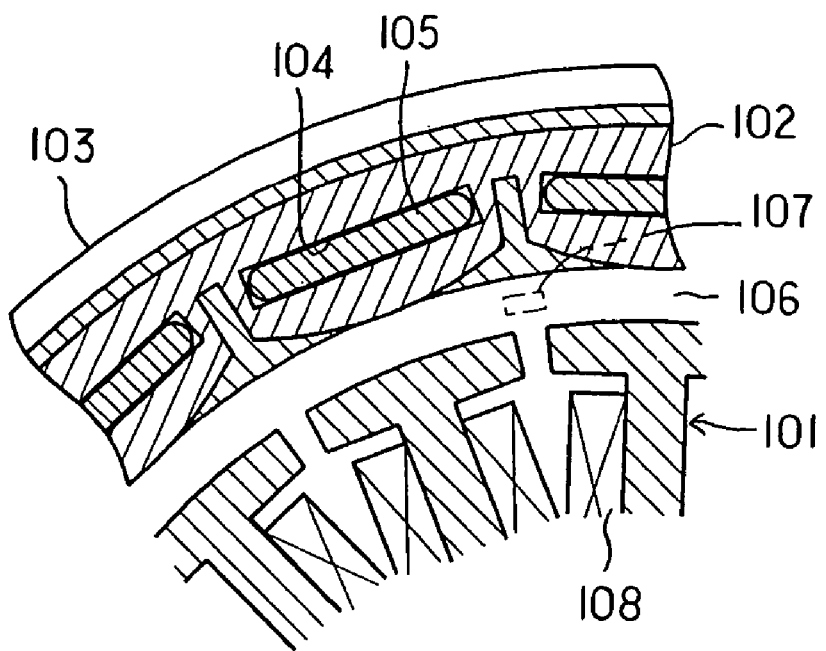
FIG. 8B is a view similar to FIG. 1B.
Figure 9:
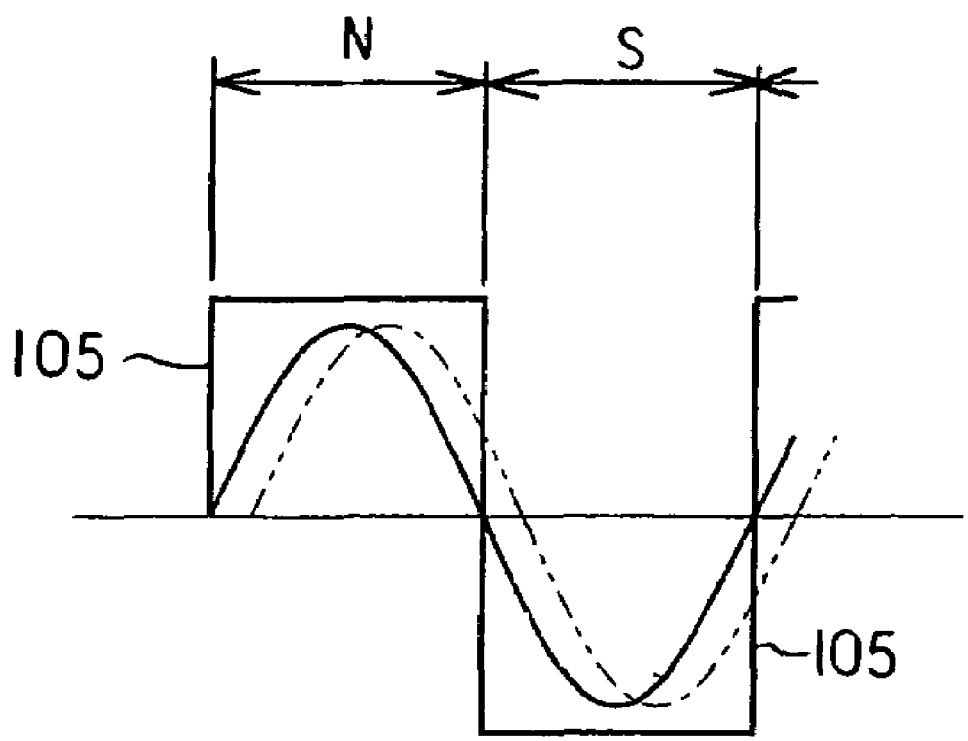
FIG. 9 shows a magnetic flux distribution.

The rotor core 18 has a plurality of slits 35 formed in the outer circumference thereof circumferentially at regular intervals as shown in FIG. 7. Each slit 35 is filled with resin when the insulating layer 25 is formed. Each slit 35 includes an open outer circumferential face and is formed into a rectangular shape. A predetermined number of slits 35 are disposed in the boundary between the magnetic poles 21. The other slits 35 are disposed in the outer circumference of the rotor magnets 24.

According to the sixth embodiment, the slits 35 are formed in the outer circumferential faces of the rotor magnets 24 as well as in the boundary between the magnetic poles. Accordingly, an unlike pole is established in the single magnetic pole 21. As a result, since shorter pitches can be employed in detecting the rotational position of the rotor core 18, the switching control can easily be carried out according to variations in the load of the coil 7.

The rotor magnet 24 is made from neodymium (Nd) in the foregoing first to sixth embodiments. However, the rotor may be made from samarium iron (SmFe) of high energy product or the like, instead.

INDUSTRIAL APPLICABILITY

As obvious from the foregoing, the rotor for the electric motor in accordance with the present invention is useful for improving an operating efficiency.

The invention claimed is:

1. A rotor for an electric motor of an outer rotor type having a stator, the rotor comprising:
   a base plate made of a magnetic material and coupled to a rotational shaft;
   a rotor core provided on the base plate and including a protrusion protruding axially relative to the base plate and teeth of the stator;
   a plurality of magnet insertion portions defined in the rotor core;
   a plurality of rotor magnets provided in the magnet insertion portions respectively, each magnet having a stator side and a counter-stator side both magnetized so as to have poles differing from each other; and
   a position sensor detecting a rotational position of the rotor core and disposed radially or axially opposite the outer peripheral face or the axial end of the rotor core so as to correspond to the protrusion, wherein the rotor core has a plurality of a slits formed therein so as to be located between the rotor magnets peripherally adjacent to each other, each slit having an open outer peripheral face.

2. The rotor according to claim 1, characterized in that each rotor magnet has an axial dimension set to be smaller than the rotor core and the position sensor is disposed outside the outer peripheral face of the rotor core so as to correspond axially to a part of the rotor core where no rotor magnet is located.

3. The rotor according to claim 1, wherein each rotor magnet has an axial dimension set to be larger than the rotor core and the axial end of the rotor core is provided with a magnetic wall located outside an outer periphery of the rotor magnet and protruding relative to 5 an axial end of the rotor magnet, the magnetic wall serving as the protrusion.

4. The rotor according to claim 1, wherein the protrusion has a surface formed with an insulating layer made from a synthetic resin.

5. The rotor according to claim 2, wherein the protrusion has a surface formed with an insulating layer made from a synthetic resin.

6. The rotor according to claim 3, wherein the protrusion has a surface formed with an insulating layer made from a synthetic resin.

7. A rotor for an electric motor of an outer rotor type which includes a stator, the rotor comprising:

a base plate made of a magnetic material and coupled to a rotational shaft;

a rotor core provided on the base plate and including a protrusion protruding axially relative to the base plate and teeth of the stator;

a plurality of magnet insertion portions defined in the rotor core;

a plurality of rotor magnets provided in the magnet insertion portions respectively, each magnet having a stator side and a counter-stator side both magnetized so as to have poles differing from each other, each magnet having an outer periphery; and a position sensor detecting a rotational position of the rotor core and disposed radially or axially opposite the outer peripheral face or the axial end of the rotor core so as to correspond to the protrusion, wherein the rotor core has a plurality of slits which are formed therein so as to correspond to outer peripheries of the magnets, each slit having an open outer peripheral face.

8. The rotor according to claim 7, wherein the protrusion has a surface formed with an insulating layer made from a synthetic resin.

* * * * *